(12) United States Patent
Tillotson

(10) Patent No.: US 11,585,544 B2
(45) Date of Patent: Feb. 21, 2023

(54) HUMIDITY CONTROL VIA SALINE SOLUTION CIRCULATION

(71) Applicant: The Boeing Company, Chicago, IL (US)

(72) Inventor: Brian Tillotson, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 933 days.

(21) Appl. No.: 16/356,884

(22) Filed: Mar. 18, 2019

(65) Prior Publication Data

US 2020/0300483 A1 Sep. 24, 2020

(51) Int. Cl.
*F24F 3/14* (2006.01)
*B01D 47/00* (2006.01)

(52) U.S. Cl.
CPC ............ *F24F 3/1405* (2013.01); *B01D 47/00* (2013.01); *F24F 3/1417* (2013.01)

(58) Field of Classification Search
CPC ........ B01D 47/00; F24F 3/1405; F24F 3/1417
See application file for complete search history.

(56) References Cited

FOREIGN PATENT DOCUMENTS

KR 101497421 * 2/2015

OTHER PUBLICATIONS

Armstrong, Paul Robert, "Performance Characteristics of a Desiccant Dehumidification System Using Calcium Chloride Solution", Thesis, Graduate College of the Oklahoma State University, Jul. 1, 1982, pp. 1-80.
Damprid, "Drop-In Moisture Absorbing Tab", Retrieved from the internet: URL: https://damprid.com/product/drop-in-tab/ [retrieved on Mar. 6, 2019], pp. 1-5.
Bates, Stephen C., "High Altitude UAV Droplet Heat Exchanger", Thoughtventions Unlimited LLC, Retrieved from the Internet: URL: http://www.tvu.com/PHAItUAVDHXweb.html [retrieved on Mar. 18, 2019], pp. 1-22.

* cited by examiner

*Primary Examiner* — Robert A Hopkins
(74) *Attorney, Agent, or Firm* — Coats & Bennett, PLLC

(57) ABSTRACT

A device to remove moisture from air. The device includes a container with an interior space that contains liquid saline solution. The interior space is configured to prevent the saline solution from escaping into the environment. A saline solution moving device moves the saline solution within the interior space. An air moving device moves air through the interior space. The movement of the air within the interior space exposes the air to the saline solution and enables moisture within the air to be absorbed into the saline solution.

13 Claims, 7 Drawing Sheets

HUMIDITY CONTROL VIA SALINE SOLUTION CIRCULATION

TECHNOLOGICAL FIELD

The present disclosure relates generally to moisture control. More specifically the present disclosure relates to devices and methods for removing moisture from air within an environment.

BACKGROUND

It can be necessary to control the humidity within an environment. This can include within the interior of a vehicle, such as an aircraft, spacecraft, submarine, etc. This can also include within the interior of a building. The humidity in these environments can be high due to the exhaled air from one or more persons located in the environment. For example, a crew of persons working in a relatively small spacecraft can quickly increase the humidity to elevated levels. Some environments can also have high humidity levels regardless of the number of persons, such as a marine vehicle or building located near water.

The high humidity levels can be uncomfortable for persons in the environment. These levels can make it more difficult for a person to cool themselves. Some persons can experience difficulty in breathing at high humidity. Further, the humidity level can increase to a level that condensation occurs on objects in the environment. The condensation can damage equipment that is located in the environment, and can lead to issues such as slippery floors. High humidity levels can also lead to the growth of mold which can cause health issues as well as create a musty odor.

SUMMARY

One aspect is directed to a device to remove moisture from air. The device includes a container with an interior space that is configured to contain the saline solution in a zero-gravity environment. A saline solution moving device moves the saline solution into and out of the interior space of the container. An air moving device moves air from the environment through the interior space and exposes the air to the saline solution in the interior space for moisture within the air to be absorbed into the saline solution.

One aspect is directed to a vehicle configured to operate in a zero-gravity environment. The vehicle includes an exterior skin that extends around and forms an enclosed space. A device is positioned to remove moisture from air within the enclosed space. The device includes: a liquid saline solution; a container with an interior space configured to contain the saline solution in the zero-gravity environment. A saline solution moving device to move the saline solution into and out of the interior space of the container; and an air moving device to move air from the enclosed space into the interior space to expose the air to the saline solution in the interior space to enable moisture within the air to be absorbed into the saline solution.

One aspect is directed to a method of removing moisture from air. The method includes moving air through an interior space of a container. The method includes containing the saline solution within the interior space in a zero-gravity environment. The method includes exposing the moving air to the saline solution within the interior space. The method includes absorbing moisture from the air in the interior space into the saline solution.

DETAILED DESCRIPTION

Figure 1A:
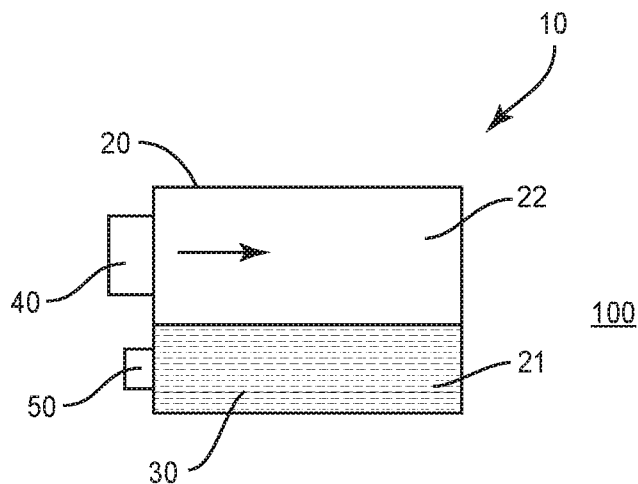
FIG. 1A is a schematic section view of a device to remove moisture from air.

FIG. 1A illustrates a schematic section view of a device 10 to remove moisture from air in a zero gravity environment 100. The device 10 includes a container 20 with an interior space 22 that contains liquid saline solution 30. The interior space 22 is configured to prevent the saline solution 30 from escaping into the environment 100. A saline solution moving device 50 moves the saline solution 30 continuously or intermittently into the interior space 22 and out of the interior space 22, for example from and to a device where moisture is removed from the saline solution 30. An air moving device 40 moves air through the interior space 22. The movement of the air within the interior space 22 exposes the air to the saline solution 30 and enables moisture within the air to be absorbed into the saline solution 30.

The saline solution moving device 50 moves fresh saline solution 30 with a higher salinity into the interior space 22 at various times. The saline solution moving device 50 also removes the older saline solution 30 that can have less saline (such as by absorbing the moisture from the air). The saline solution moving device 50 can be equipped with one or more inlets 51 and outlets 53 to provide for introducing and removing the saline solution 30. The saline solution 30 can be removed in various timings. In one design, the volume of saline solution 30 within the interior space 22 remains relatively constant as fresh saline solution 30 is introduced at the same time that older saline solution is removed.

The device 10 is designed to be used in the zero gravity environment 100. This environment 100 results in no apparent force of gravity acting on the device 10 (i.e., apparent weightlessness). To accommodate for this environment 100, the device 10 is configured to cause an interaction between the air and the saline solution 30 to expose the air to the saline solution 30 and to enable the moisture to be absorbed by the saline solution 30. Contexts include but are not limited to an environment within the interior of a vehicle that is in orbit or in free fall.

The saline solution 30 is a mixture of salt and liquid. The amount of salt in the saline solution 30 can vary.

The device 10 can include various types of air moving devices 40. The air moving device 40 is configured to move air from the environment 100 into and through the container 20. One example of air moving devices 40 is a fan. The device 10 can include a single air moving device 40, or two or more air moving devices 40. In designs with two or more air moving devices 40, the devices 40 can be the same or different, and can include the same or different air-moving capacities.

Saline solution moving devices 50 move the saline solution 30 into and out of the interior space 22. Examples of saline solution moving devices 50 include but are not limited to pumps, propellers, and impellors. The device 10 can include a single saline solution moving device 50, or two or more saline solution moving devices 50. In designs with two or more saline solution moving devices 50, the devices 50 can be the same or different, and can include the same or different saline solution-moving capacities.

Figure 1B:
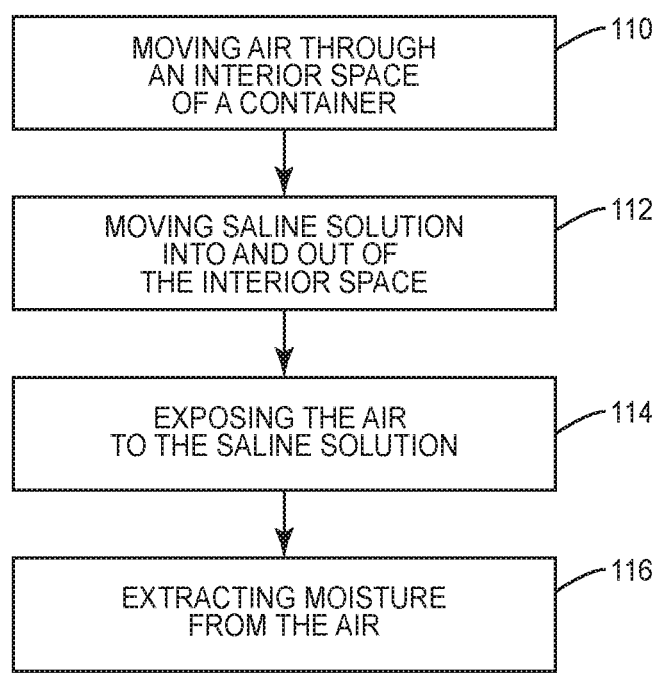
FIG. 1B is a flowchart diagram of a method of removing moisture from air.

FIG. 1B illustrates a method of removing moisture from air. Air from the environment 100 is moved through the interior space 22 of the container 20 (block 110). Saline solution 30 is also moved continuously or intermittently within the interior space 22 of the container 20 (block 112). As the air moves through the interior space 22, the air is exposed to the saline solution 30 within the interior space 22 (block 114). As the air is exposed to the saline solution 30, moisture in the air is extracted and moves into the saline solution 30 (block 116).

Figure 2A:
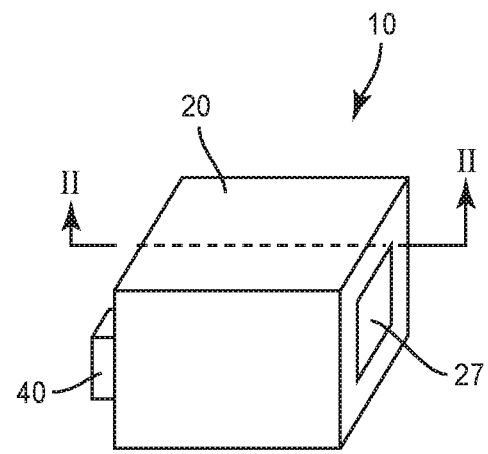
FIG. 2A is a perspective view of a device to remove moisture from air.
Figure 2B:
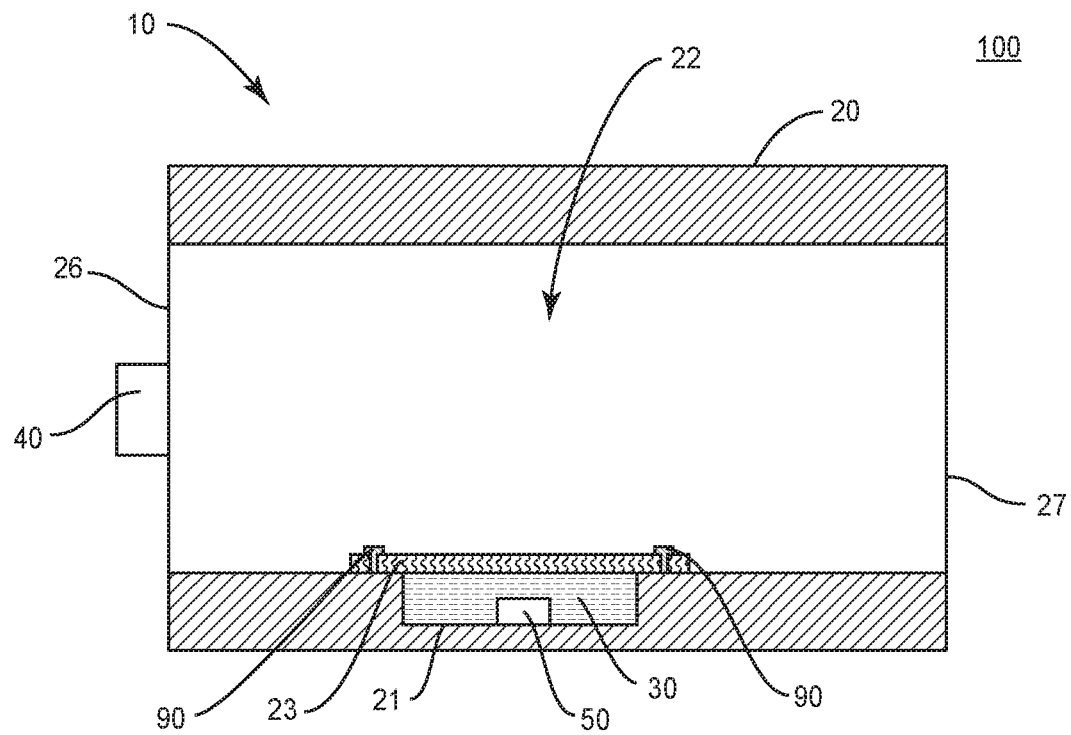
FIG. 2B is a schematic section view of the device of FIG. 2A cut along line II-II.

FIG. 2A illustrates a device 10 to remove moisture from the air and FIG. 2B illustrates a section view of the device 10. The device 10 includes a container 20 with an interior space 22. A first end 26 forms an inlet for air in the environment 100 to enter into the interior space 22. A second end 27 forms an outlet 27 for the air to move back into the environment 100. The size and shape of the interior space 22 can vary, as well as the size and positioning of the first and second ends 26, 27.

A receptacle 21 in the container 20 is positioned along the interior space 22 to hold the saline solution 30. The receptacle 21 can be formed into the container 20 as illustrated in FIG. 2B. The receptacle 21 can also include a separate element that is attached to the container 20 (not illustrated). FIG. 2B illustrates a single receptacle 21 positioned along the interior space 22. Other designs can include two or more receptacles 21. The size and positioning of the one or more receptacles 21 can vary.

A sheet 23 extends over the receptacle 21 to contain the saline solution 30 within the receptacle 21. The sheet 23 can be attached to the container 20 with one or more fasteners 90. The sheet 23 is configured to allow the moisture in the air to pass into the receptacle 21, and prevent the escape of the liquid saline solution 30 from the receptacle 21. In one design, the sheet 23 is microporous polytetrafluoroethylene (PTFE). The fasteners 90 can include but are not limited to rivets, screws, threaded stitches, and pins. The sheet 23 can also be attached by an adhesive either alone or in combination with one or more fasteners 90.

One or more air moving devices 40 are positioned to move the air through the interior space 22. The one or more air moving devices 40 can be positioned at various locations along the container 20, including at the first end 26 as illustrated. One or more saline solution moving devices 50 are positioned to move the saline solution 30 within the receptacle 21. The saline solution moving devices 50 can be positioned in the receptacle 21, or can be positioned away from the receptacle 21. In one design, the one or more air moving devices 40 are configured to both move the air and the saline solution 30.

Figure 3:
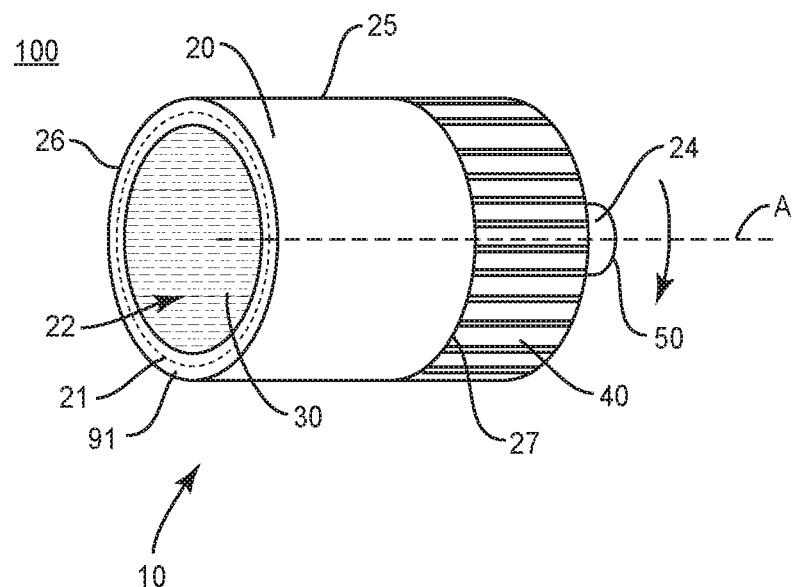
FIG. 3 is a schematic diagram of a device to remove moisture from air.

FIG. 3 includes a device 10 to remove moisture from the air. The container 20 can include a cylindrical shape with a wall 25 that extends around and forms a central interior space 22. The wall 25 is open at opposing ends to form a first end 26 and opposing second end 27 as illustrated in FIG. 3. A central axis A extends through the interior space 22 and each of the first and second ends 26, 27.

A rotational device 24 can be configured to rotate the container 20. The rotational device 24 can include a motor that applies a force to rotate the container 20 that is positioned on a mount. The rotational device 24 can be configured to rotate the container 20 about the central axis A. The cylindrical shape of the container 20 can facilitate rotation about the central axis A. The rotational device 24 can also be configured to rotate the container 20 about a line offset from the central axis A. This offset rotation can instill a wobble in the container 20 that can facilitate movement of the saline solution 30.

Lips 91 can extend radially inward toward the central axis A from the wall 25 to form one or more receptacles 21 to contain the saline solution 30. The lips 91 form barriers that contain the liquid saline solution 30 along the wall 25. The rotation of the container 20 by the saline solution moving device 50 pins the saline solution 30 against the inner surface of the wall 25 due to centripetal acceleration. The saline solution 30 can be exposed to the interior space 22 to provide for contact with the air. In one design, lips 91 are formed at each of the first end 26 and the second end 27 of the container 20. One or both of the lips 91 can be positioned at different locations along the length of the interior space 22. Further, additional lips 91 can extend from the wall to form separate receptacles 21 to contain the saline solution 30.

During rotation of the container 20, the saline solution 30 can move and spread out along the inner side of the wall 25. This can increase the amount of exposed surface area of the saline solution 30 to increase exposure with the air within the interior space 22.

The air moving device 40 can be attached to the second end 27 of the container 20. The air moving device 40 draws the air through the open first end 26 and into the interior space 22 where it is exposed to the saline solution 30. The air moving device 40 then removes the air through the second end 27. In one design, the air moving device 40 is a centrifugal fan, commonly referred to as a squirrel cage fan. The air moving device 40 can be connected to and rotate with the container 20. Other designs can include the air moving device 40 remaining stationary during rotation of the container 20.

In use, the container 20 is rotated by the rotational device 24. The rotation applies a force due to centripetal acceleration on the saline solution 30 to position the saline solution 30 against the wall 25. The air from the environment 100 is moved into the interior space 22 by the air moving device 40. The air is exposed to the saline solution 30 to enable the moisture within the air to be absorbed into the saline solution 30. The drier air is then moved by the air moving device 40 through the second end 27 and back out into the environment 100.

FIGS. 4, 5, and 6 disclose another device 10 that includes a container 20 with a wall 25 that extends around and forms an interior space 22. The interior space 22 can be enclosed to prevent the saline solution 30 from leaking. The interior space 22 includes a central axis A.

Figure 5:
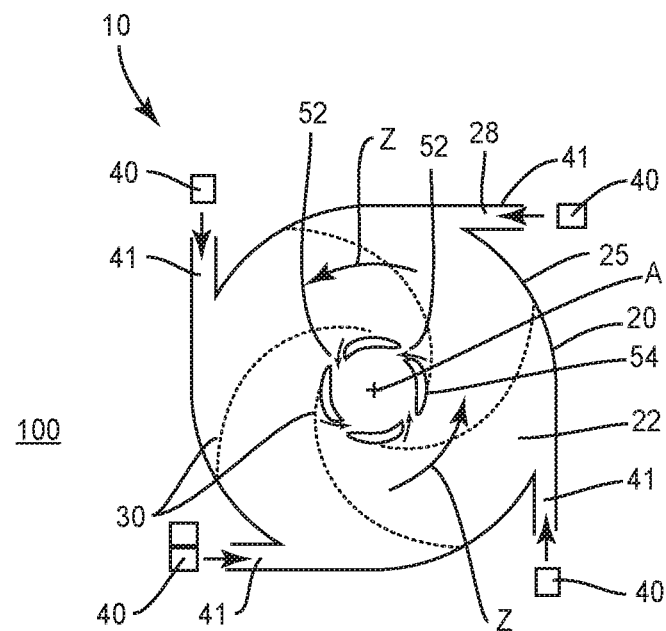
FIG. 5 is a schematic section view of the device of FIG. 4 cut along line V-V.

The air moving device 40 can be positioned within the interior space 22 to draw air through one or more inlets 41. In one design, multiple inlets 41 extend through the wall 25 of the container 20. The inlets 41 can each face in the same direction along the wall 25. In one specific design as illustrated in FIG. 5, the inlets 41 face tangential to the central axis A. This positioning of the inlets 41 causes the air within the interior space 22 to rotate around the central axis A as illustrated by arrow Z in FIG. 5. An outlet 42 is positioned along the central axis A to remove the air from the interior space 22.

Figure 4:
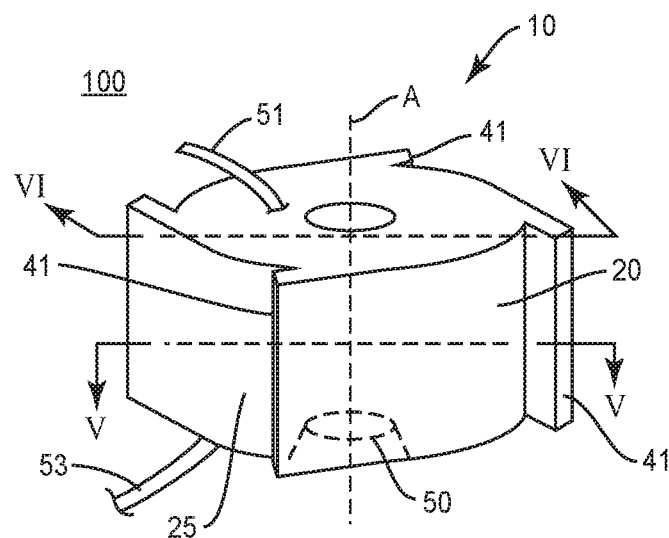
FIG. 4 is a perspective view of a device to remove moisture from air.
Figure 6:
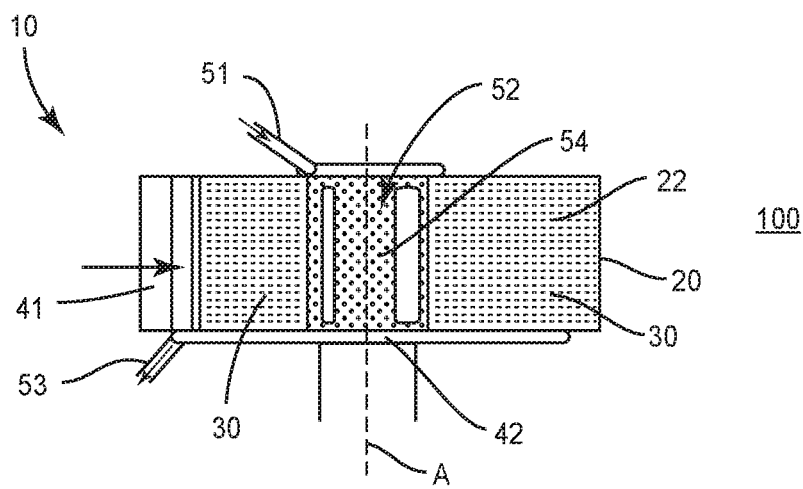
FIG. 6 is a schematic section view of the device of FIG. 4 cut along line VI-VI.

The saline solution 30 is introduced into the container 20 through one or more inlets 51 as illustrated in FIGS. 4 and 6. The saline solution moving device 50 can be located within the device 10, or can be positioned upstream along the one or more lines that feed the saline solution 30 into the one or more inlets 51. The one or more inlets 51 feed into an ejector member 54 located in the interior space 22 along the central axis A. The ejector member 54 includes orifices 52 through which the saline solution 30 is radially expelled outward towards the wall 25. The orifices 52 and the pressure of the saline solution 30 within the ejector member 54 causes the saline solution 30 to be expelled as drops into the interior space 22. The drops of saline solution 30 absorb moisture from the air that is in the interior space 22. The saline solution 30 is removed from the interior space 22 through one or more outlets 53.

In use, air from the environment 100 moves through the one or more inlets 41 and into the interior space 22. The orientation of the one or more inlets 41 provides for the air in the interior space 22 to rotate around the central axis A. The saline solution 30 is moved into the container 20 and expelled through the orifices 52 of the ejector member 54 into the interior space 22. The saline solution 30 can be expelled as drops that move through the interior space 22 towards the wall 25. The saline solution 30 is exposed to and absorbs moisture from the air in the interior space 22.

The saline solution 30 is removed through one or more outlets 53. The drier air is similarly removed through one or more outlets 42. In one design, the ejector member 54 includes one or more openings through which the air is collected and moved out of the interior space 22 through the one or more air outlets 42.

Figure 7:
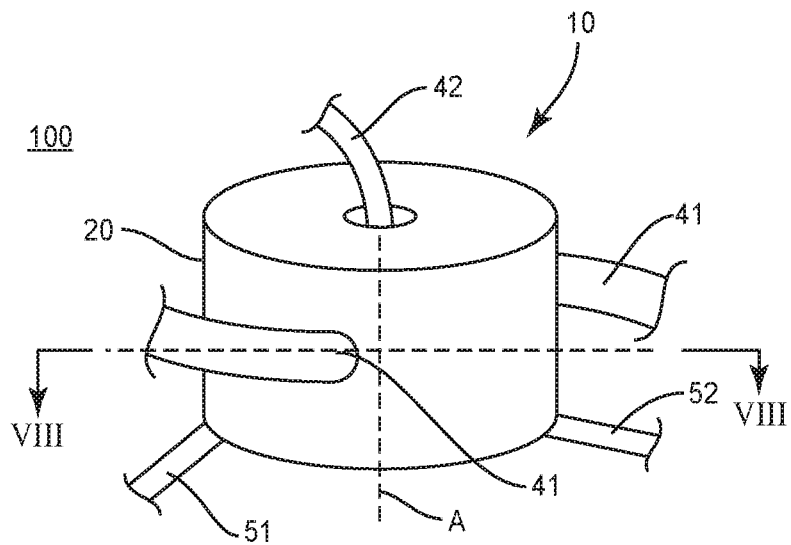
FIG. 7 is a perspective view of a device to remove moisture from air.
Figure 8:
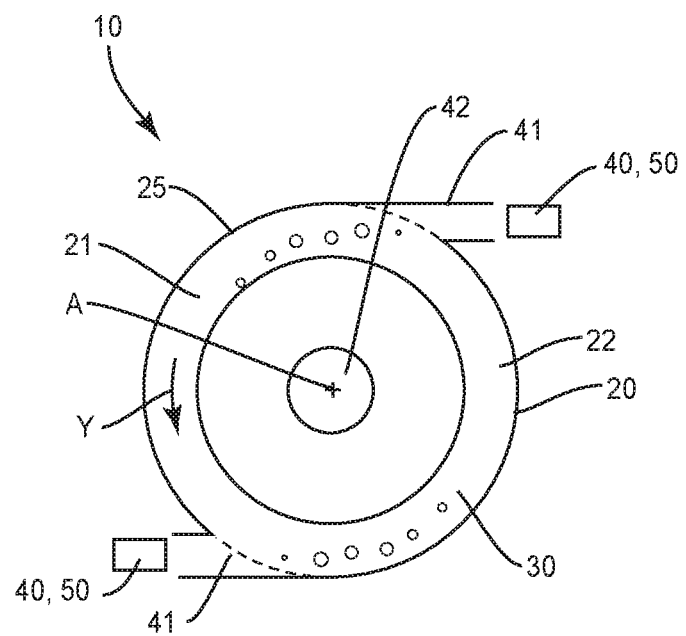
FIG. 8 is a schematic section view of the device of FIG. 7 cut along line VIII-VIII.

FIGS. 7 and 8 illustrate another device 10 to remove moisture from the air. The device 10 includes a container 20 that contains the saline solution 30. The saline solution 30 fills a relatively large amount of the volume of the interior space 22. One or more inlets 51 and outlets 53 can supply and remove the saline solution 30 into and from the interior space 22.

One or more inlets 41 supply air from the environment 100 into the interior space 22. One or more outlets 42 remove the drier air from the interior space 22 for return back to the environment 100.

The one or more air inlets 41 introduce the air into the interior space 22 below the surface of the saline solution 30. The air is formed into bubbles as it is introduced into the saline solution 30. The bubbles move through the saline solution 30 exposing the air and providing for the moisture in the air to be absorbed by the saline solution 30. The drier air is removed through the one or more outlets 42 and back into the environment 100.

The one or more inlets 41 can be oriented to introduce the air tangentially into the container 20. This causes the air to circulate within the saline solution 30. This can also provide a force to rotate the saline solution within the interior space 22 as illustrated by arrow Y in FIG. 8. Thus, the air moving device 40 also acts as the saline solution moving device 50. In some designs, the saline solution moving device 50 can also include a rotating vane, pump, or propeller within the interior space 22 to move the saline solution 30.

In use, saline solution 30 is positioned within the container 20. Air from the environment 100 is introduced into the saline solution 30 through the one or more inlets 41. The air is formed into bubbles when introduced below the surface of the saline solution 30. The bubbles move through the saline solution 30 allowing the moisture in the air to be absorbed by the saline solution 30. The drier air is removed from the interior space 22 through one or more outlets 42 and returned to the environment 100.

Figure 9:
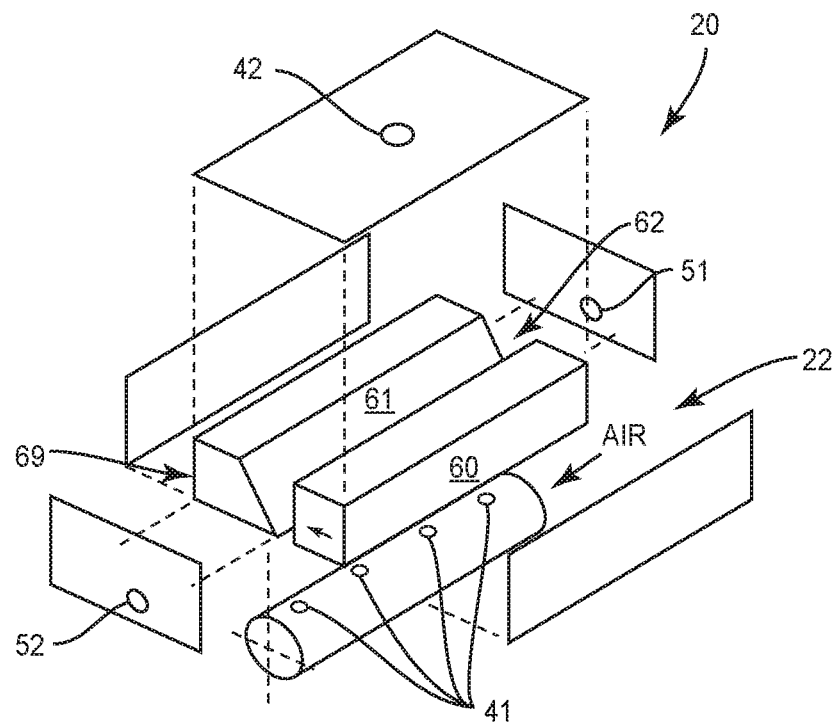
FIG. 9 is an exploded perspective view of a device to remove moisture from air.
Figure 10:
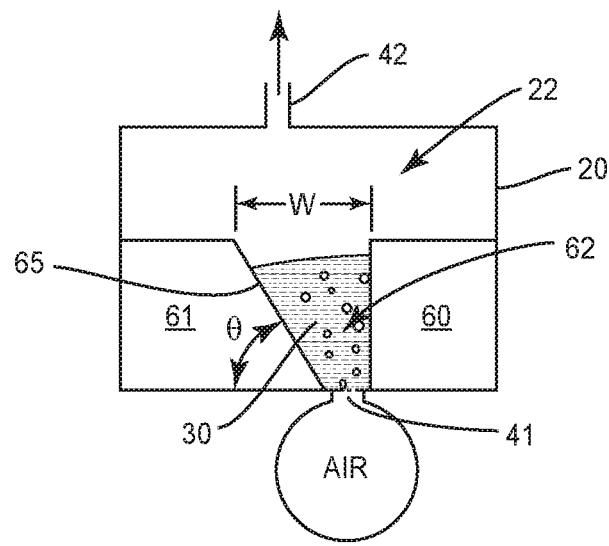
FIG. 10 is a schematic end view of the magnetic device of FIG. 9.

FIGS. 9 and 10 illustrate a device 10 to remove moisture from air. As schematically illustrated in FIG. 9, the device 10 includes a magnetic device 69 positioned within the interior space 22 of the container 20. The container 20 can be constructed from various wall members. The magnetic device 69 includes a magnet 60 and a ferromagnetic member 61. A gap 62 is formed between the magnet 60 and the ferromagnetic member 61. A magnetic field is formed in the gap 62 due to the interaction of the magnet 60 and the ferromagnetic member 61. The saline solution 30 is positioned in the gap 62. The saline solution 30 includes at least one paramagnetic salt, such as a halide of manganese, cobalt, nickel, or iron (e.g., manganese chloride, cobalt iodide). The paramagnetic salt causes the saline solution 30 to be attracted by the magnetic field.

As illustrated in FIG. 10, the gap 62 includes a width W measured between the magnet 60 and the end 65 of the ferromagnetic member 61. The width W has a tapered shape that increases from the air inlet 41 towards the air outlet 42. The extent of the taper can differ with the angle θ formed between the end 65 and adjacent side 66 varying between various acute angles that are smaller than a right angle. The slanted end 65 of the ferromagnetic member 61 causes the magnetic field to be greater at the air inlet 41 (i.e., at the smallest width W) and become less towards the air outlet 42 (as the width W increases). Because of the gradient in the intensity of the magnetic field, pressure in the saline solution 30 is greater at the narrow end of the gap 62 than at the wider end. The difference in pressure propels bubbles of air from the air inlet 41 to the air outlet 42.

One or more air inlets 41 introduce the air from the environment 100 into the interior space 22 at a point within the saline solution 30. In one design, the one or more air inlets 41 include a number of relatively small holes. The small holes and the high pressure gradient facilitate formation of small air bubbles. The small air bubbles provide a better surface-to-volume ratio than large bubbles thus improving the dehumidification performance of the device 10.

The air bubbles move from the one or more air inlets 41 towards the one or more air outlets 42. The air bubbles emerge from the surface of the saline solution 30 and exit the interior space 22 through the one or more air outlets 42. The magnetic force within the gap 62 attracts the saline solution 30 to prevent the saline solution 30 from exiting through the one or more air outlets 42. The saline solution 30 can be introduced into the gap 62 through one or more inlets 51 and exit through one or more outlets 53.

The magnet 60 can be a single member, or can include two or more separate magnets. Similarly, the ferromagnetic member 61 can be a single or multiple members.

In use, the paramagnetic saline solution 30 is positioned in the gap 62. Air from the environment 100 is introduced through the one or more air inlets 41 into the saline solution 30. The incoming air forms bubbles that move through the saline solution 30 causing moisture in the air to be absorbed by the saline solution 30. The drier air moves through the saline solution 30 and exits through one or more air outlets 42.

Figure 11:
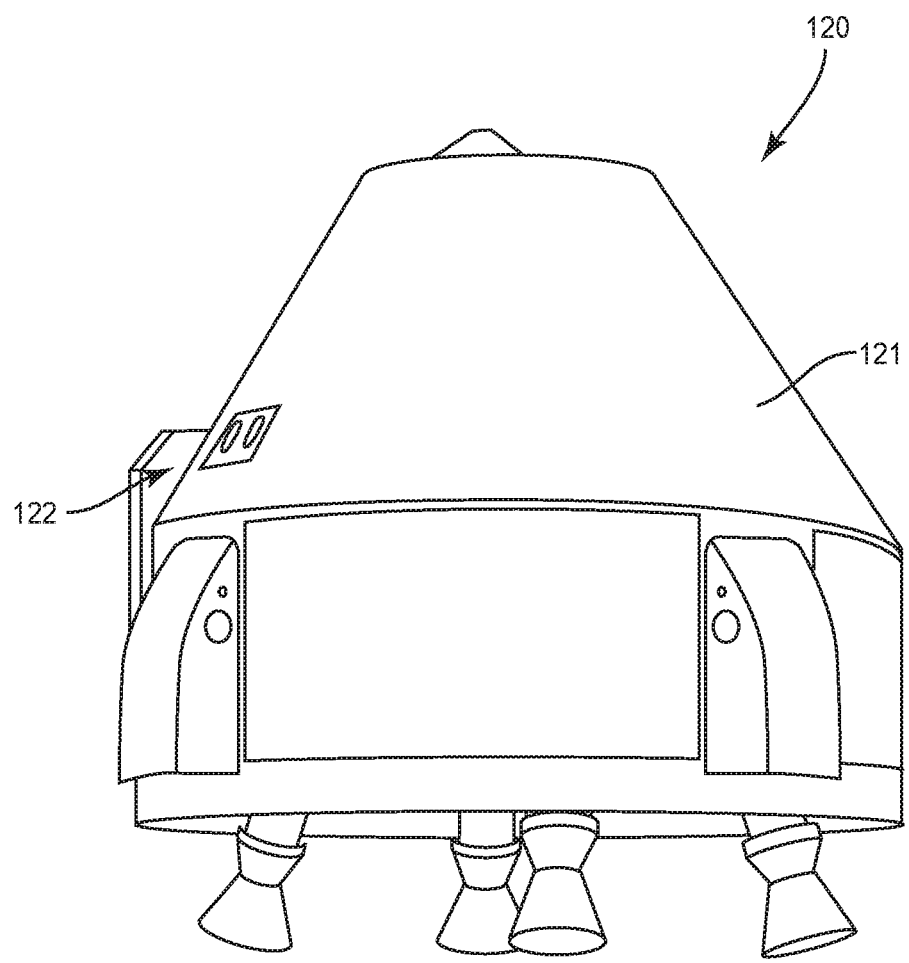
FIG. 11 is a perspective view of a vehicle for use with a device to remove moisture from air.

The various devices 10 are designed for use in an environment 100 with zero gravity. This can include use within a variety of vehicles 120, such as but not limited to a spacecraft 120 as illustrated in FIG. 11. The spacecraft 120 includes an exterior skin 121 that extends around and forms an enclosed interior space 22. The device 10 is positioned in the interior space 22 to control the humidity.

The device 10 can also be used within an environment 100 with a gravitational force. This includes a variety of contexts, including but not limited to within a vehicle 120 such as an aircraft that is within the Earth's atmosphere, a vehicle on a body of water, a vehicle that is underwater, and various structures such as a building.

The device 10 can be used in a variety of different vehicles 120. Vehicles 120 can include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A device to remove moisture from air, the device comprising:
    a container comprising a wall that extends around an interior space with the interior space comprising a holding area configured to contain a liquid saline solution in a zero-gravity environment;
    one or more inlets in the wall to receive air from the environment with the one or more inlets positioned away from the holding area;
    a saline solution moving device to move the saline solution into and out of the holding area of the interior space; and
    an air moving device to move air from the environment and into the one or more inlets and through the interior space and to expose the air to the saline solution in the interior space for moisture within the air to be absorbed into the saline solution;
    the one or more inlets positioned away from the holding area for the air to be introduced into the interior space prior to being exposed to the liquid saline solution.

2. The device of claim 1, wherein the container further comprises a receptacle that houses the saline solution and a sheet that separates the saline solution in the receptacle from the air in the interior space, the sheet allows the moisture in the air to pass through and into the saline solution in the receptacle.

3. The device of claim 1, wherein the saline solution moving device is positioned within a central section of the interior space, the saline solution moving device comprising outlets that face radially outward toward the wall to direct the saline solution in drops from the central section of the interior space radially outward towards the wall.

4. The device of claim 1, wherein each of the one or more inlets face in a tangential direction into the interior space to introduce the air into the saline solution and circulate the saline solution within the interior space.

5. The device of claim 4, further comprising one or more air outlets that are spaced radially inward from the wall to receive the air that has passed through the saline solution, the one or more air outlets positioned in the interior space radially inward from a surface of the saline solution.

6. The device of claim 1, wherein the saline solution moving device and the air moving device are a single unit.

7. A vehicle configured to operate in a zero-gravity environment, the vehicle comprising:
    an exterior skin that extends around and forms an enclosed space;
    a device to remove moisture from air within the enclosed space, the device comprising:
        a liquid saline solution;
        a container comprising an interior space configured to contain the saline solution in the zero-gravity environment;
        inlets that extend through a wall of the container and into the interior space;
        a saline solution moving device to move the saline solution into and out of the interior space of the container; and
        an air moving device to move air from the enclosed space and through the inlets and into the interior space to expose the air to the saline solution in the interior space to enable moisture within the air to be absorbed into the saline solution.

8. A method of removing moisture from air, the method comprising:
    introducing air into a container and moving the air through an interior space of the container with the air being introduced through multiple inlets in the container;
    introducing saline solution into the interior space separately from the air;
    containing the saline solution within the interior space in a zero-gravity environment;
    exposing the moving air to the saline solution within the interior space; and
    absorbing moisture from the air in the interior space into the saline solution.

9. The method of claim 8, further comprising spraying drops of the saline solution through the air in the interior space and transferring the moisture from the air to the drops of the saline solution.

10. The method of claim 8, further comprising introducing the air into the saline solution and forming bubbles of the air in the saline solution and absorbing the moisture in the air from the bubbles into the saline solution.

11. The method of claim 8, further comprising the multiple inlets positioned to each face in a common direction and thereby rotating the saline solution with the air within the interior space.

12. The device of claim 1, further comprising the saline solution moving device being spaced away from the air moving device.

13. The device of claim 1, further comprising a port for introducing the saline solution into the holding area, the port positioned away from the one or more inlets.

* * * * *